(Model.)
H. A. SHAW.
BAND CUTTER AND SCATTERER.
No. 243,804. Patented July 5, 1881.
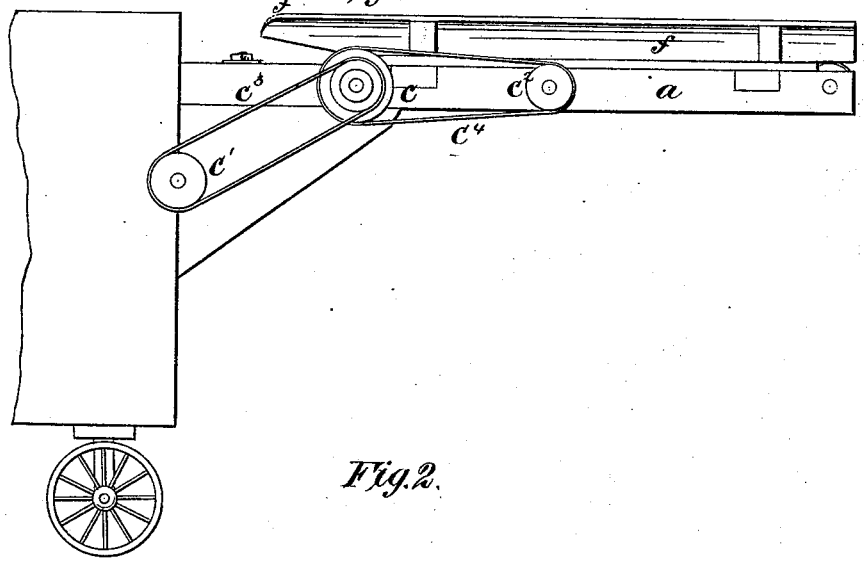
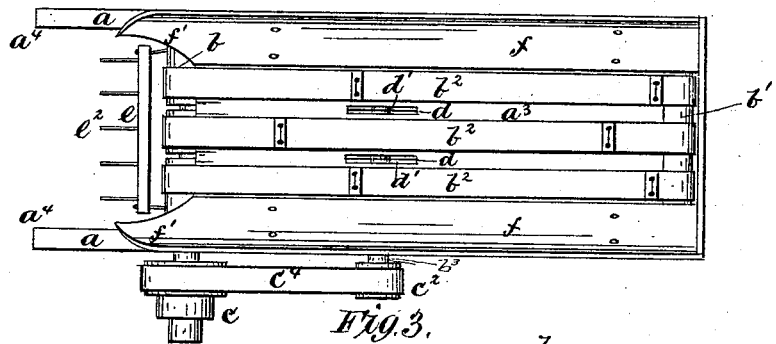
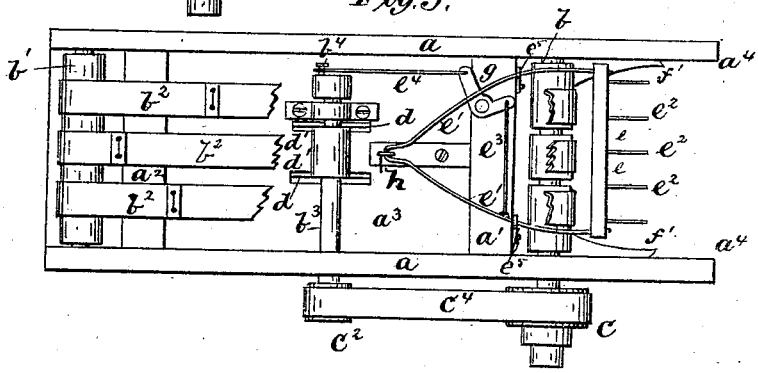
Witnesses:
M. M. Lacey
A. Parker
Inventor:
Howard A. Shaw
By R. S. & A. P. Lacey
Attys.

UNITED STATES PATENT OFFICE.

HOWARD A. SHAW, OF GALENA, OHIO.

BAND CUTTER AND SCATTERER.

SPECIFICATION forming part of Letters Patent No. 243,804, dated July 5, 1881.

Application filed February 26, 1881. (Model.)

*To all whom it may concern:*

Be it known that I, HOWARD A. SHAW, a citizen of the United States, residing at Galena, in the county of Delaware and State of Ohio, have invented certain new and useful Improvements in Band Cutters and Scatterers for Thrashing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a substantial device which may be readily applied to the feed-board of any ordinary thrashing-machine.

It consists in the peculiar construction and arrangement of its several parts hereinafter described, and specifically pointed out in the claim.

In the drawings, Figure 1 is a side elevation of the feed-board of a thrashing-machine having my band-cutter and feeder applied thereto. Fig. 2 is a plan of the band cutter and feeder, and Fig. 3 is a view of the under side of the same.

$a\ a$ are two parallel sills or bars, connected together by cross-bars $a'\ a^2$, forming a substantial frame. On this frame is fixed a tight platform, $a^3$, one end of which is flush with, or nearly flush with, the outer end thereof, while the inner end falls short of the inner end of said bars, so as to have the ends $a^4\ a^4$ project far enough to permit the shaker hereinafter described, to operate between them.

$b\ b'$ are two rollers journaled in the side bars, $a\ a$, and arranged at the ends of platform $a^3$, so that they will carry the endless belts $b^2$, which are carried around them and over and under the platform, as shown. The rollers are so arranged with reference to the platform that they permit the belts to slide directly on the upper side of said platform. The end of the shaft of the roller $b$ has fixed in it a suitable pulley, $c$, by which it may be connected to a pulley, $c'$, on the shaft of the thrashing-cylinder, and to a pulley, $c^2$, on the end of a roller, $b^3$, journaled in the bars $a\ a$ below the platform $a^3$.

$d\ d$ are circular knives fixed on the roller $b^3$, and constructed and arranged so that they project upward through slots $d'$ in the platform $a^3$ and between the belts $b^2$, as shown. The pulleys $c\ c'\ c^2$ are driven by the belts $c^3\ c^4$, and thus motion is given to the rollers $b\ b'\ b^3$, and to the belts $b^2$ and knives $d$.

$e$ is the shaker-head, which is supported on two curved arms, $e'\ e'$, fixed to its ends or extremities, as shown. The arms are carried back almost parallel with each other and with the side bars, $a$, and through hangers $e^5$, pivoted on the cross-bars $a'$ of the frame. The arms are thence curved inward and extended to a common point, $h$, where they are pivoted on the same staple, so that they will swing laterally simultaneously. The supporting-arms $e'$ are inclined slightly upward from the head $e$ toward the bottom $d$, so that the belts $b^2$ will pass between them and under the pivoted center $h$. The shaker is arranged below the level of the platform $a^3$, so that the grain receives a slight fall from the latter before it is caught by the shaker. This slight fall gives an incline to the position of the grain, which drops between the fingers $e^2$, which thereby get a better hold and do better work in scattering or spreading the grain over the face of the feed-board of the thrasher. The belts $b^2$ pass downward between the shaker-head $e$ and the roller $b$, and between the outer ends of the shaker-arms $e'\ e'$, and below the pivoted center of said arms. The arms $e'$ will strike the edges of the outer belts, if the latter be by any means thrown outward out of line, and will force them back into place. The arrangement of the shaker-head with reference to the belts prevents short or tangled straw from being drawn under the frame and getting into the shaking apparatus. The shaker is operated by a bell-crank lever pivoted on the cross-bar $a'$. It is connected to the bell-crank by a rod, $e^3$, and the bell-crank is connected to a crank by a rod, $e^4$, to a crank-pin, $b^4$, fixed on the shaft $b^3$, as shown.

$f\ f$ are two guide-boards, which have their lower edges fixed to the top of the platform $a^3$, while they are flared outward, so as to give a trough-like shape to the device. The lower edges of the guide-boards are set in so as to touch, or nearly touch, the outer edge of the outer belts, $b^2$. The inner ends, $f'f'$, extend over the roller $b$ and serve to cause the grain to drop more regularly downward into the shaker $e$.

The device may be readily attached to any ordinary thrasher and to a horizontal or inclined feed-board; or it can be substituted for and supported in the place of the feed-board with very little trouble and without expense.

The bundles of grain are laid on the trough-shaped receptacle. The belts $b^2$ will carry them over the knives which cut the bands. The cut bundles are then carried by the belts and dropped down onto the shaker, which spreads the straw before the latter reaches the cylinder.

Having described my invention, what I claim, and desire to obtain by Letters Patent, is—

In a band cutter and feeder, the combination of the shaker-head $e$, provided with fingers $e^2$, and arranged slightly in advance of and below the roller $b$, shaker-arms $e'e'$, having their forward ends fixed to the extremities of the shaker-head and carried backward and slightly upward under the platform $d$ and pivoted to the under side of the bottom $d$, hangers $e^5$, pivoted to the under side of the platform or bottom of the frame, the belts $b^2$, carried around the rollers $b$ $b'$, and between the shaker-head and roller $b$, and between the shaker-arms $e'e'$, and below the pivoted inner ends of the shaker-arms, and the necessary operating mechanism for giving simultaneous motion to the knives, belts, and shaker, substantially as set forth.

In testimony whereof I affix my signature, in presence of two witnesses, on this 10th day of February, 1881.

HOWARD A. SHAW.

Witnesses:
 E. W. C. COOK,
 JOHN DERTHICK.